United States Patent [19]

Wilson

[11] Patent Number: 4,614,625
[45] Date of Patent: Sep. 30, 1986

[54] METHOD OF IMPARTING COLOR AND/OR FRAGRANCE TO CANDLE WAX AND CANDLE FORMED THEREFROM

[75] Inventor: William W. Wilson, Norwich, Ohio

[73] Assignee: Lumi-Lite Candle Company, Inc., Norwich, Ohio

[21] Appl. No.: 732,221

[22] Filed: May 8, 1985

Related U.S. Application Data

[63] Continuation of Ser. No. 470,191, Feb. 28, 1983, abandoned.

[51] Int. Cl.$^4$ .......................... B05D 7/00; B29B 9/00; D04H 1/20; F23D 3/16
[52] U.S. Cl. .......................................... 264/6; 264/7; 264/112; 427/212; 427/346; 431/126; 431/288; 431/291
[58] Field of Search ............... 252/522 A; 422/4, 125, 422/126; 427/212, 220, 222, 346, 242; 428/484; 431/126, 288, 291; 8/521; 264/259, 6, 7, 112

[56] References Cited

U.S. PATENT DOCUMENTS

| | | | |
|---|---|---|---|
| 1,596,017 | 8/1926 | Harnisch | 431/126 |
| 1,964,200 | 6/1934 | French et al. | 431/126 |
| 2,187,053 | 1/1940 | Pratt | 431/126 |
| 3,385,649 | 5/1968 | Hicks | 431/126 |
| 3,565,831 | 2/1971 | Detert | 252/522 |
| 4,241,692 | 12/1980 | Van Hijfte et al. | 118/303 |
| 4,427,366 | 1/1984 | Moore | 431/291 |
| 4,449,987 | 5/1984 | Lindauer | 431/288 |

FOREIGN PATENT DOCUMENTS 585288  9/1933  Fed. Rep. of Germany ...... 431/288

Primary Examiner—Michael R. Lusignan
Attorney, Agent, or Firm—Frank H. Foster

[57] ABSTRACT

Prilled wax particles are coated by tumbling and rubbing the particles and a scenting and/or a coloring agent together in a flexible container, either by hand kneading or with a mechanical agitator. Liquid carriers compatible with the wax particles are included in the coloring and scenting agents to facilitate absorption of the agents into the particles. A candle is subsequently formed by molding the coated particles under pressure with a central wick into either a free standing form or pressed into a surrounding container.

8 Claims, 7 Drawing Figures

METHOD OF IMPARTING COLOR AND/OR FRAGRANCE TO CANDLE WAX AND CANDLE FORMED THEREFROM

This is a continuation, of application Ser. No. 470,191, filed Feb. 28, 1983, now abandoned.

BACKGROUND OF THE INVENTION

The present invention relates generally to the manufacture of candles and more particularly to a method of imparting color and/or fragrance to candle wax.

Owing perhaps to its ancient heritage or to the relative ease with which raw materials may be obtained, commercial candlemaking remains profitable, at least for some, even when conducted on a small, local scale. Machinery and mass production have not replaced manual techniques completely, especially where variously scented and colored candles are made from a single batch of candle wax.

In the past, candle wax was scented or colored by mixing the selected ingredients with wax in its unformed, molten state or by dripping formed and hardened candles in a solution of dye, pigment and/or perfume. The relative superiority, or inferiority, of these methods depended upon the ingredients to be added. Substantially more dye or pigment, for instance, had to be added to molten wax to obtain the same color provided by surface coating. On the other hand, it was preferable to add a perfuming agent to molten wax rather than to the surface of a preformed and hardened candle because surface evaporation would eventually eliminate the scent of a surface coated candle.

The present method combines some of the aesthetic properties achieved by mixing coloring or scenting agents with molten wax and some of the economy achieved by adding these ingredients to hardened, molded candles. This combination is accomplished by mixing the coloring and/or scenting agents with relatively small, uniform pieces of hardened wax. The treated pieces of wax may then be compression molded or otherwise formed into free-standing or container-filling candles. Unlike the molten wax mixture, only the particles' surfaces and in some cases, inner portions immediately adjacent thereto are able to absorb the coloring and scenting materials. And, unlike dipping shaped and hardened candles in the desired ingredients, the present invention provides treated wax that may be formed into a candle whose perfume or tint are more uniform throughout the candle. Thus the appearance and odor of candles made with wax that is treated according to the present invention are enhanced over those of a dipped candle without requiring the amounts of coloring and fragrance found in candles whose ingredients were added in the molten stage.

SUMMARY AND OBJECTS OF THE INVENTION

The present invention involves a method of imparting to candle wax a coloring and/or a scenting agent suitable for candles. The method comprises, basically, the steps of: (a) combining the selected agent or agents with a plurality of generally rounded particles of candle wax; and (b) coating these particles with the selected agent(s) by agitating the particles and agent(s) together.

The present invention also includes a method of making a scented and/or a colored candle which consists of: (1) forming a plurality of separate particles of candle wax; (2) combining the coloring and/or scenting agents with these particles; (3) coating the particles with the selected agent or agents by agitating the particles and agent(s) together; and (4) disposing the coated and dried particles in surrounding relation to a candle wick.

Finally, the present invention covers a candle that comprises a candle wick and candle wax disposed in surrounding relation to the wick and formed from a plurality of particles of candle wax, each of the particles of candle wax having a greater exterior concentration than interior concentration of a coloring and/or a scenting agent.

A primary object of the present invention is to provide a method of making colored and/or scented candle wax and candles that employs relatively small quantities of coloring and/or scenting agents without limiting unduly the color and/or scent of the product.

Another object of the present invention is to provide a method of making colored and/or scented candle wax and candles that is adaptable to large and small production runs.

A further object of the present invention is to provide a method that permits the number, quantity, and concentration of coloring and/or scenting agents added to candle wax to vary over a wide range.

Yet another object of the present invention is to provide a candle formed from a plurality of wax particles, each of which has a greater exterior than interior concentration of a coloring and/or scenting agent.

These as well as other objects and advantages may be appreciated in light of the description and accompanying drawings.

DESCRIPTION OF THE PREFERRED EMBODIMENT

Figure 2:
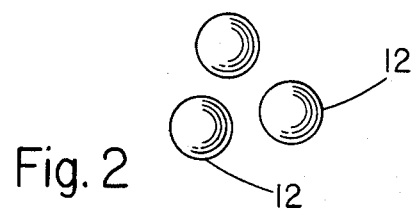
FIG. 2 is an enlarged perspective view of the prilled wax granules preferably employed in the present invention.
Figure 3:
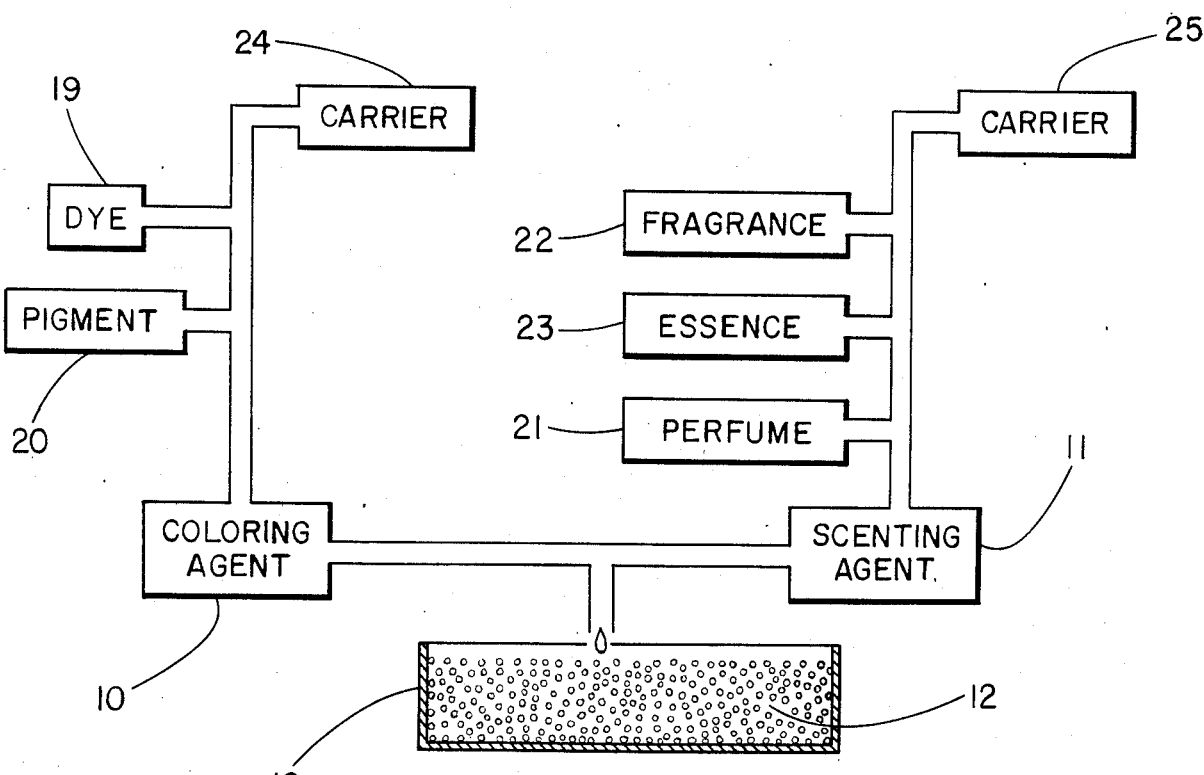
FIG. 3 is a diagram of a manner in which coloring and scenting agents may be combined with the wax particles.
Figure 4:
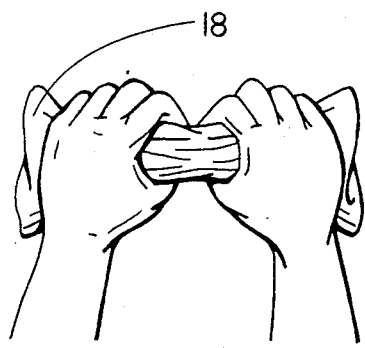
FIG. 4 is a perspective view of a manner in which the wax particles may be coated with coloring and/or scenting agents.

As indicated in FIGS. 2, 3 and 4, the present method basically comprises the steps of combining either a coloring agent 10, a scenting agent 11, or both with numerous, substantially solid particles of candle wax 12 and coating these wax particles 12 with the coloring and/or scenting agents 10 and 11 by agitating the particles and the agent together. The candlewax employed in this process may be practically any known type of fuel wax, with refined or semirefined paraffins, well known in the art of candlemaking, being the waxes of choice. The particles of wax so composed may exist in a variety of forms, ranging in size from powdered or ground wax particles approximately one-tenth of a millimeter in length or diameter to chips or other pieces of wax approximately two centimeters in length or diameter. Preferably, however, the wax particles 12 are generally spherical, prilled granules having an average mean diameter no greater than one (1) millimeter.

Figure 1:
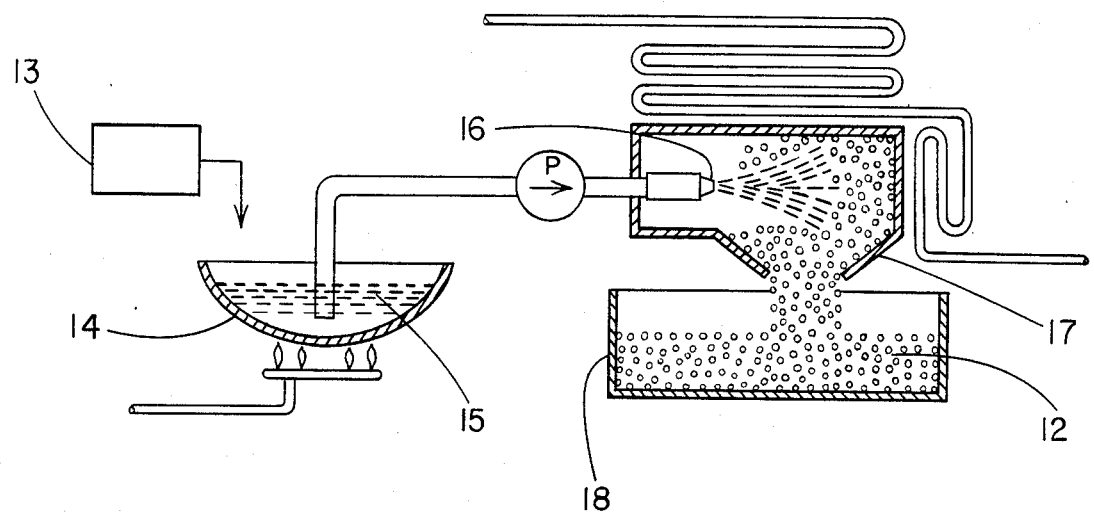
FIG. 1 is a diagram of a manner in which wax particles suitable for use in the present method may be formed.

The prilled wax particles 12 may be formed conventionally as indicated in FIG. 1, by first melting a solid piece of paraffin 13 in a vat or similar vessel 14 and then spraying the molten wax 15 through a nozzle 16 into a cooling chamber 17. The finely dispersed liquid solidifies as it falls through the relatively cooler air in the chamber 17 and forms the prilled granules 12 that, to the naked eye, appear to be spheroids about the size of grains of sand. Once formed, the prilled wax 12 is deposited in a container 18 and combined with the coloring agent 10 and/or scenting agent 11, as diagrammed in FIG. 3.

While it is necessary to raise the temperature of the block of paraffin 13 above its melting point in order to form prilled wax granules 12, the steps of combining the particles of wax with a scenting and/or coloring agent and coating the particles with coloring and/or scenting agents, are conducted at a temperature that permits the particles to remain substantially solid. Thus, ambient temperatures may be employed advantageously throughout much of the present process.

A wide variety of coloring and scenting agents, well known in the art of candle making, are available for use with the prilled wax. As indicated diagrammatically in FIG. 3, one or more dyes 19 or pigments 20 provide the desired hue to the coloring agent 10, and one or more perfumes 21, fragrances 22, essences 23 or other aromatic oils provide the desired odor to the scenting agent 11. Preferably, the coloring and scenting agents also include liquid carriers 24 and 25, respectively, which vary, depending upon the type of color- or scent-imparting ingredient employed. The addition of liquid organic carriers 24 and 25 to the respective coloring and scenting agents 10 and 11 is preferred because such carriers are compatible with petroleum-based waxes and tend, therefore, to be more readily absorbed into the prilled wax granules 12.

A light grade of oil, such as paraffin or mineral oil, serves well as the carrier 24 for the coloring agent 10 when one or more pigments 20 are employed. The pigment 20 should be a finely ground, organic toner so that the wick 24 of a candle 25 (FIG. 8), formed eventually from pigment-covered wax particles, does not clog as the wax is burned. The preferred carriers 24 for use with dyes 19 are organic solvents, such as relatively low moleculor weight, aromatic hydrocarbon solvents; e.g. toluene and xylene. The dyes 19 ordinarily form true solutions with their carriers 24, whereas the pigments 20, even in finely ground toner forms, are in colloidal suspension with their carriers 24. Since dyes tend to ionize in solution, they are more readily absorbed into the prilled wax granules, whereas pigment-based coloring agents tend to remain closer to the surface of the wax.

Although candle perfumes 21, fragrances 22 and essences 23 are processed and supplied ordinarily in liquid form, an additional liquid organic carrier 25 is preferably added to make the scenting agent 11 more compatible with and hence, more easily absorbed into, the paraffin granules 12. Relatively thin plasticizers, such as diethyl phthalate, work well as carriers for relatively high viscosity essences 23, and relatively thick plasticizers, such as dipropylene glycol, work well as carriers for relatively low viscosity fragrances 22 and perfumes 21.

Once the coloring and scenting agents have been formulated, the desired quantities are combined with the prilled wax granules. When both coloring and scenting agents are employed, it is preferable to combine the agents together and then add the resulting mixture to the wax. It is also possible, however, to add the agents separately to the wax. Having added the agent or agents to the wax, the granules are coated by agitating the wax particles and the coloring and/or scenting agents together. The agitating step consists of tumbling and/or rubbing the particles and agent(s) together. Preferably, the agent or agents are distributed substantially uniformly among the particles of wax, although it is entirely possible, if desired, to have a more random pattern of distribution. The coating step may be accomplished by hand, as indicated in FIG. 4, or with the aid of mechanical tumblers and agitators when relatively large quantities of prilled wax are being colored and/or scented. The container 18 into which the particles and agent or agents are deposited is, preferably, a flexible plastic bag that can be sealed temporarily at its open end. Once excess air is removed, the bag 18 is sealed, and the operator squeezes or kneads the bag at various points to thoroughly rub or mechanical device the ingredients together.

Figure 6:
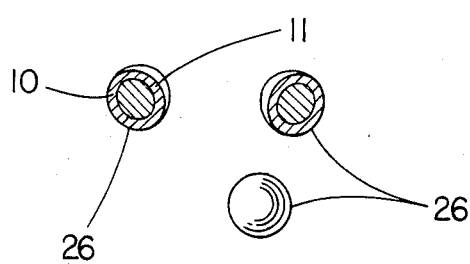
FIG. 6 is an enlarged perspective view of the coated wax particles.

The coloring and scenting agents 10 and 11 are preferably in liquid or semi-liquid form as a result of the use of the liquid carriers 24 and 25. As a result, the wax particles, once coated, tend to be slightly tacky and to clump together. As previously indicated, however, the use of organic carriers 24 and 25 enhance the absorbability of the respective coloring and scenting agents 10 and 11, thereby reducing the amount of liquid on the surfaces of the wax particles. In addition, excess surface liquid may be minimized by limiting the amount of carrier employed, as well as the quantities of coloring and/or scenting agents added to a given quantity of particles, so that said particles are not "swimming" in one or more of said agents. Preferably, the selected agent or agents do not permeate the granules, but are instead found in higher concentration on the exterior than on the interior of the particles. As indicated in FIG. 6, the coloring and scenting agents 10 and 11 inevitably migrate toward the center of the wax particles 26; nevertheless, it is undesirable to saturate the particles, as this adds little to the quality of the candle formed therefrom, requires larger quantities of coloring and/or scenting agent, and tends to leave the surfaces of the coated particles damp. If however, an excessive amount of dye-solvent coloring agent is added to the wax particles, the coated particles may be air-dried once the distribution step is completed. In this manner, an excessive quantity of solvent may be evaporated, leaving the coated granules 26 in a more free-flowing state. An excessive quantity of scenting agent should not be evaporated by air flow, however, as this process tends to remove too much of the fragrance.

Figure 5:
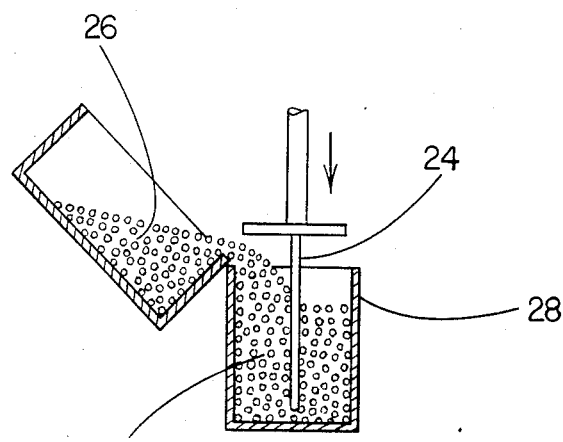
FIG. 5 is a diagram of a manner in which the wax particles, once coated, may be formed into a candle.
Figure 7:
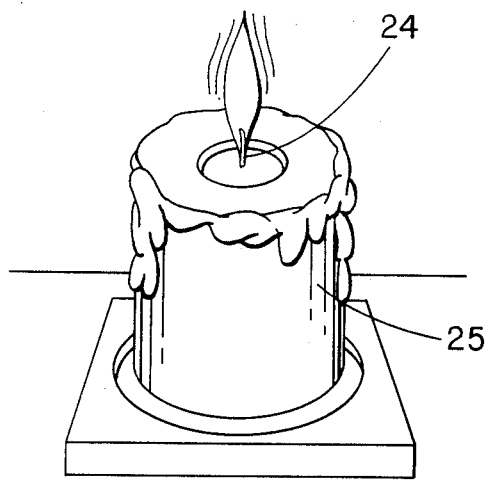
FIG. 7 is a perspective view of a candle formed according to the present invention.

Once the coated particles 26 have been prepared, a candle may be formed by disposing said particles 26 in a mold or container 28 in surrounding relation to a wick 24 (FIG. 5). Preferably variable amounts of pressure are applied to the particles. A free-standing candle 25 (FIG. 7) may be formed conventionally by applying relatively greater amounts of pressure and then removing the mold 28. Alternatively, the container 28 may be decoratively fashioned from metal, plastic or glass, and the particles 26 may be fixed in said container with relatively smaller amounts of pressure.

REPRESENTATIVE EXAMPLES

The following coloring and scenting agents are quantified in relative terms with respect to a constant quantity of wax particles. More or less of these ingredients may be combined with a given quantity of wax particles to vary the intensity of color and/or fragrance, as long as the relative quantities of the ingredients remain constant. The percentage figures provided with some of the specific scenting agents are by weight.

| Particle Coating No. | Coloring Agent | Scenting Agent |
|---|---|---|
| 1. | 192 Parts Benzidine Yellow LS 400 (toner) | Banana CS-3984 (2%) (Universal) |
| 2. | No Color | Pineapple 2233 Coconut A-548 (3%) (Norotek) |
| 3. | 96 Parts Bontone Brown LS 900 (organic toner) 48 Parts Solvisperse Brown, 1141 (oil soluable dye) | Chocolate FR-2136 (3%) (Bell) |
| 4. | 192 Parts Benzedine Yellow, LS 400 (toner) 48 Parts Bontone Brown LS 900 (toner) | Patchouly A-545 (2%) |
| 5. | 96 Parts Cyan Blue LS 600 (toner) 48 Parts Rose LS 501 (toner) | Universal 511733 (2%) |
| 6. | 48 Parts Cyan Blue LS 600 (toner) | A-550 (supplier: Norotek) (2%) |
| 7. | 72 Parts Solvisperse Brown 1141 (oil soluble dye) 8 Parts Dianisidine Orange LS 700 (toner) | A-515 (supplier: Norotek) |
| 8. | 144 Parts Solvisperse Green 1741 (oil soluble dye) 96 Parts Cyan Blue LS 600 (toner) | A-504 (supplier: Norotek) |
| 9. | 24-Parts Carbon Black LS-100 144 Parts Phthalocyanine Green LS-800 (toner) | A-562 (supplier: Norotek) |
| 10. | 48 Parts Cyan Blue LS 600 (toner) 96 Parts Rose LS 501 (toner) | A-557 (supplier: Norotek) 3% |
| 11. | 96 Parts Rose LS 501 (toner) | #3286 (supplier: Norotek) 3% |
| 12. | 96 Parts Dianisidine Orange LS-700 (toner) | A-505 (supplier: Norotek) 3% |
| 13. | 7 Parts Bontone Brown LS 900 16 Parts Benzidine Yellow LS-400 (toner) | A-502 (supplier: Norotek) 2% |
| 14. | 96 Parts Phthalocyanine Green LS 800 (toner) 48 Parts Benzidine Yellow LS 400 | A-517 (supplier: Norotek) 2½% |
| 15. | 144 Parts Solvisperse Green 1741 (oil soluble dye) | A-503 (supplier: Norotek) 3% |
| 16. | 192 Part Solvisperse Red 1641 (oil soluble dye) 96 Parts Benzidine Yellow LS 400 | A-518 (supplier: Norotek) 2½% |
| 17. | 96 Parts Rose LS 501 (toner) 24 Parts Carbon Black LS 100 | A-565 (supplier: Norotek) |
| 18. | 192 Parts Rose LS 501 (toner) 96 Parts Benzidine Yellow LS 400 | Cranberry Sfc-101 |

While a variety of embodiments and examples of the present invention have been described in some detail, it is intended that further refinements and formulas may be developed without departing from the spirit of the invention or the scope of the following claims.

I claim:

1. A method of imparting to candle wax an agent from a group comprising coloring and scenting agents suitable for candles, said method comprising the steps of:
   (a) mixing said agent with a plurality of generally rounded unmelted particles of candle wax; and
   (b) coating said particles with said agent by agitating said particles and causing them to rub against each other and coat said agent into the surface of said particles.

2. A method in accordance with claim 1 and further comprising the step of disposing the particles in surrounding relation to a candle wick to form a candle.

3. The method of imparting an agent to candle wax according to claim 1, wherein said particles are generally spherical and have a mean diameter no greater than one (1) millimeter.

4. The method of imparting an agent to candle wax according to claim 1, wherein said particles and said agent are agitated by tumbling and rubbing said particles and agent together in a flexible container.

5. The method of imparting an agent to candle was according to claim 1, wherein said agent is a suspension of a finely ground pigment in a light grade of oil.

6. The method of imparting an agent to candle wax according to claim 1, wherein said agent is a solution of a dye in an organic solvent.

7. The method of imparting an agent to candle wax according to claim 1, wherein said agent is formed with a candle perfume and a liquid organic carrier.

8. A method of making a candle provided with an agent from a group comprising coloring and scenting agents suitable for candles, said method comprising the steps of:
   (a) forming a plurality of generally rounded particles of candle wax;
   (b) combining said agent with said particles;
   (c) coating said particles with said agent by agitating said particles and causing them to rub against each other and coat said agent into the surface of said particles; and
   (d) disposing said particles in surrounding relation to a candle wick.

* * * * *